United States Patent
Takahashi et al.

(10) Patent No.: US 9,352,221 B2
(45) Date of Patent: May 31, 2016

(54) VIDEO GAME PROCESSING APPARATUS, METHOD AND COMPUTER PROGRAM PRODUCT OF PROCESSING VIDEO GAME

(75) Inventors: Mitsunori Takahashi, Tokyo (JP); Ginpei Tomoe, Tokyo (JP); Taku Watanabe, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 945 days.

(21) Appl. No.: 12/637,149

(22) Filed: Dec. 14, 2009

(65) Prior Publication Data
US 2010/0184498 A1 Jul. 22, 2010

(30) Foreign Application Priority Data
Dec. 17, 2008 (JP) .................................. 2008-321124

(51) Int. Cl.
*A63F 13/60* (2014.01)
*A63F 13/40* (2014.01)
*A63F 13/58* (2014.01)
*A63F 13/45* (2014.01)

(52) U.S. Cl.
CPC ................. *A63F 13/10* (2013.01); *A63F 13/45* (2014.09); *A63F 13/58* (2014.09); *A63F 13/60* (2014.09); *A63F 2300/65* (2013.01); *A63F 2300/807* (2013.01)

(58) Field of Classification Search
CPC .................................................. A63F 2300/65
USPC ....................................................... 463/8, 23
See application file for complete search history.

(56) References Cited

U.S. PATENT DOCUMENTS

| | | | | |
|---|---|---|---|---|
| 5,680,533 A * | 10/1997 | Yamato et al. | | 345/473 |
| 6,302,792 B1 * | 10/2001 | Arai et al. | | 463/23 |
| 6,582,308 B1 * | 6/2003 | Yamajiri et al. | | 463/31 |
| 6,666,764 B1 * | 12/2003 | Kudo | | 463/8 |
| 6,761,638 B1 * | 7/2004 | Narita | | 463/43 |
| 7,318,772 B2 * | 1/2008 | Horigami et al. | | 463/8 |
| 7,367,882 B2 * | 5/2008 | Fukutome | | 463/7 |
| 7,637,806 B2 * | 12/2009 | Rhyne et al. | | 463/9 |

(Continued)

FOREIGN PATENT DOCUMENTS

JP 2008-200255 9/2008

OTHER PUBLICATIONS

"Dissidia Final Fantasy, Dengeki PlayStation vol. 435", ASCII Media Works Inc., Software Information Center accepted at Dec. 16, 2008, vol. 14, No. 47, total vol. 461, pp. 18-31.

(Continued)

*Primary Examiner* — Jay Liddle
(74) *Attorney, Agent, or Firm* — Greenblum & Bernstein, P.L.C.

(57) ABSTRACT

A video game processing apparatus for controlling progress of a video game is provided. The video game includes a battle against an enemy character. A basic character that becomes a basis for the enemy character is determined when the battle is started. Additional data on items are determined. The items are allowed to set up to the determined basic character. The items include at least one of an equipping ability, an equipped item, and an equipped accessory in addition to a strength level on the battle and a level on the video game. The enemy character is then generated by setting up the determined additional data to the determined basic character. Basic character data in which the basic character to become the basis for the enemy character is associated with the items of the additional data are stored in a basic data memory.

17 Claims, 7 Drawing Sheets

(56) References Cited

U.S. PATENT DOCUMENTS

| | | |
|---|---|---|
| 2004/0038739 A1* | 2/2004 | Wanat .............................. 463/36 |
| 2007/0265047 A1* | 11/2007 | Nomura ............................ 463/8 |
| 2008/0146333 A1 | 6/2008 | Kando et al. |
| 2008/0146335 A1 | 6/2008 | Toriyama |
| 2008/0293466 A1 | 11/2008 | Arakawa et al. |
| 2009/0143137 A1 | 6/2009 | Asano |
| 2009/0149248 A1* | 6/2009 | Busey et al. .................... 463/29 |
| 2009/0325707 A1 | 12/2009 | Ichimura |

OTHER PUBLICATIONS

"Final Fantasy VIII Ultimania", DigiCube co., Ltd., Mar. 31, 1999, pp. 1888.

Japan Office action, dated Dec. 21, 2010 along with an english translation thereof.

* cited by examiner

Fig. 2
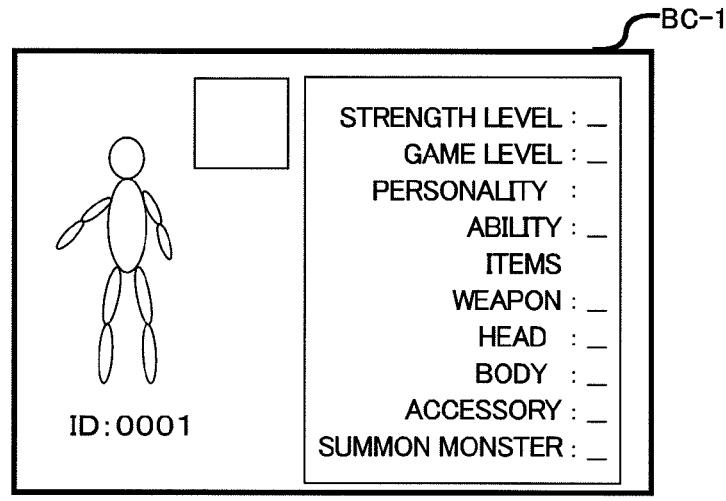
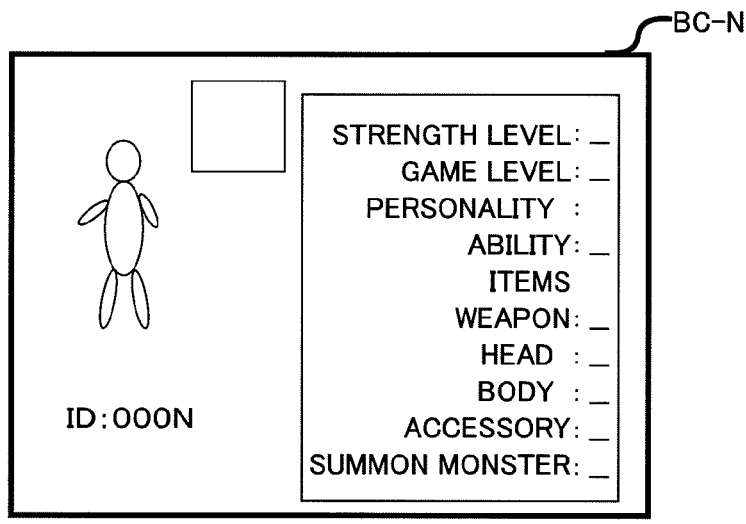

Fig. 4

ENEMY CHARACTER MANAGING TABLE

| ID | STRENGTH LEVEL | GAME LEVEL | ABILITY | ITEMS | ACCESSORY | SUMMON MONSTER | HP | ... |
|---|---|---|---|---|---|---|---|---|
| 0001 | NORMAL | 1 | ABILITY A | WEAPON: KNIFE<br>HEAD: CAP<br>BODY: LEATHER ARMOR | NON | NON | 100/100 | ... |

Fig. 5

BASIC CHARACTER MANAGING TABLE

| ID | NAME | GAME LEVEL | MAXIMAL HP | ... |
|---|---|---|---|---|
| 0001 | A | 1 | 100 | ... |
|  |  | 2 | 150 |  |
|  |  | 3 | 250 |  |
|  |  | ⋮ | ⋮ |  |
| 0002 | B | ⋮ | ⋮ | ⋮ |
| ⋮ | ⋮ | ⋮ | ⋮ | ⋮ |

Fig. 6

STRENGTH LEVEL MANAGING TABLE

| STRENGTH | CUSTOM RANK | ACTION RANK | ADJUSTMENT LV |
|---|---|---|---|
| WEAKEST | WEAKEST | H | -5 |
| WEAKER | WEAK | F TO G | -3 |
| WEAK: ACTION | NORMAL | F | 0 |
| WEAK: CUSTOM | WEAK | D TO E | 0 |
| NORMAL: | NORMAL | D TO E | 0 |
| STRONG: ACTION | NORMAL | D TO E | 0 |
| STRONG: CUSTOM | STRONG | C | 0 |
| STRONGER | STRONG | B TO C | +3 |
| STRONGEST | STRONGEST | A | +5 |

Fig. 7

ABILITY MANAGING TABLE

|  | STRATEGIC TYPE | BRAVE TYPE | ADVERSE TYPE | ... |
|---|---|---|---|---|
| ABILITY A | ◎ | ○ | ○ | ... |
| ABILITY B |  |  | ◎ | ... |
| ABILITY C |  |  |  | ... |
| ABILITY D | ◎ | ◎ | ○ | ... |
| ⋮ | ⋮ | ⋮ | ⋮ | ⋮ |

Fig. 8

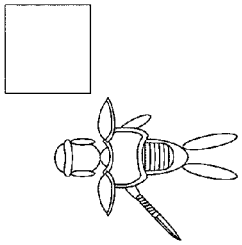

NPC-1A

STRENGTH LEVEL : NORMAL
GAME LEVEL : 1
PERSONALITY : STRATEGIC TYPE
ABILITY : ABILITY A
ITEMS
 WEAPON : KNIFE
 HEAD : CAP
 BODY : LEATHER ARMOR
 ACCESSORY : NON
SUMMON MONSTER : NON

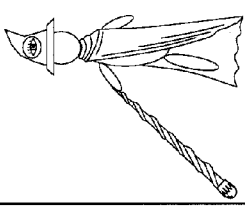

NPC-1B

STRENGTH LEVEL : STRONGEST
GAME LEVEL : 10
PERSONALITY : ADVERSE TYPE
ABILITY : ABILITY B
ITEMS
 WEAPON : MAGIC WAND
 HEAD : MAGIC HAT
 BODY : MAGIC ROBE
 ACCESSORY : MAGIC RING
SUMMON MONSTER: DEMON WALL

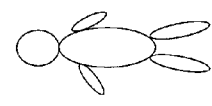

BC-1

STRENGTH LEVEL :
GAME LEVEL :
PERSONALITY :
ABILITY :
ITEMS
 WEAPON :
 HEAD :
 BODY :
 ACCESSORY :
SUMMON MONSTER :

VIDEO GAME PROCESSING APPARATUS, METHOD AND COMPUTER PROGRAM PRODUCT OF PROCESSING VIDEO GAME

CROSS-REFERENCE TO RELATED APPLICATION

The present application relates to subject matter contained in Japanese Patent Application No. 2008-321124, filed on Dec. 17, 2008, the disclosure of which is expressly incorporated herein by reference in its entirety.

BACKGROUND OF THE INVENTION

1. Field of the Invention

The present invention relates to technique to control progress of a video game by displaying a player character operated by a player on a game screen.

2. Description of the Related Art

Heretofore, various video games called an RPG (role-playing game: a game in which a player plays a role of a character in a world of the game, and accomplishes a predetermined object while enjoying a process that the character grows through various experiences) and various video games called a fighting action game mainly enjoying a battle against an enemy character have been provided.

In a battle scene of these video games, a battle is carried out between player characters operated by the respective players, or a battle is carried out between a player character and an enemy character controlled in accordance with a control program provided in advance. An enemy character, which becomes a fighting opponent controlled by a control program, is generally managed while its parameters are fixed.

In order to increase variations on staging of an enemy character in a battle scene, an apparatus that uses parameters of enemy characters to output (or give forth) sound effects for various characters with a few kind of audio data and a real audio according to appearance has been proposed (see Japanese Patent Application Publication No. 2008-200255, for example).

However, in the conventional game system described above, data on enemy characters are managed while the parameters are fixed. Thus, there has been a problem that the amount of data for managing the enemy characters becomes enormous in the case where a variety of enemy characters each having different parameters is caused to appear on a battle.

SUMMARY OF THE INVENTION

The present invention has been made in order to solve the problem described above, and it is an object of the present invention to provide a video game processing apparatus, a method and a computer program product of processing a video game, by which it is possible to carry out battle control in which a fight (or battle) against a variety of enemy characters can be carried out in a battle scene without a need of management data containing a large amount of data.

In order to achieve the above object, one aspect of the present invention is directed to a video game processing apparatus for displaying a player character operated by a player on a display screen and controlling progress of a video game. In this case, the video game includes a battle against an enemy character. The video game processing apparatus according to the present invention includes a basic character determiner for determining a basic character when the battle is started, the basic character becoming a basis for the enemy character.

The video game processing apparatus also includes an additional data determiner for determining additional data on items, the items being allowed to set up to the basic character determined by the basic character determiner.

The video game processing apparatus also includes an enemy character generator for generating the enemy character by setting up the additional data determined by the additional data determiner to the basic character determined by the basic character determiner.

Since the video game processing apparatus has a configuration as described above, it is possible to carry out battle control in which a fight (or battle) against a variety of enemy characters can be carried out in a battle scene without a need of management data containing a large amount of data.

In the video game processing apparatus according to the present invention, it is preferable that the items of the additional data allowed to set up to the basic character include at least one of an equipping ability, an equipped item, and an equipped accessory in addition to a strength level on the battle and a level on the video game, and that the additional data determiner determines one strength level from plural steps of strength levels that are defined in advance; determines a level on the video game of the enemy character on the basis of a level on the video game of the player character and the determined strength level; and determines additional data on other items within a range defined by the determined strength level.

In the video game processing apparatus according to the present invention, it is preferable that the video game processing apparatus further includes: a basic data memory for storing basic character data in which the basic character to become the basis for the enemy character is associated with the items of the additional data allowed to set up to the basic character; and an additional data specifying screen presenter that refers to the basic character data to present the player with an additional data specifying screen, the additional data specifying screen being used to specify the additional data on the items allowed to set up to the basic character determined by the basic character determiner, wherein the additional data determiner determines the additional data specified using the additional data specifying screen as the additional data to be set up to the basic character.

In the video game processing apparatus according to the present invention, it is preferable that the video game processing apparatus further includes a basic data memory for storing basic character data in which the basic character to become the basis for the enemy character is associated with the items of the additional data allowed to set up to the basic character, wherein the additional data determiner refers to the basic character data to automatically determine the additional data on the items allowed to set up to the basic character.

Further, another aspect of the present invention is directed to a method of processing a video game by displaying a player character operated by a player on a display screen and controlling progress of a video game. In this case, the video game includes a battle against an enemy character. The method according to the present invention includes determining a basic character when the battle is started, the basic character becoming a basis for the enemy character.

The method also includes determining additional data on items, the items being allowed to set up to the determined basic character.

The method also includes generating the enemy character by setting up the determined additional data to the determined basic character.

Moreover, still another aspect of the present invention is directed to a computer program product for processing a video game by displaying a player character operated by a player on a display screen and controlling progress of a video game. In this case, the video game includes a battle against an enemy character. The computer program product according to the present invention causes a computer to execute steps including determining a basic character when the battle is started, the basic character becoming a basis for the enemy character.

The steps also include determining additional data on items, the items being allowed to set up to the determined basic character.

The steps also include generating the enemy character by setting up the determined additional data to the determined basic character.

According to the present invention, it is possible to provide a video game capable of carrying out battle control in which a fight (or battle) against a variety of enemy characters can be carried out in a battle scene without a need of management data containing a large amount of data.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing a summary of basic character data;

FIG. 4 is an explanatory drawing showing an example of a storage state of an enemy character managing table;

FIG. 5 is an explanatory drawing showing an example of a storage state of a basic character managing table;

FIG. 6 is an explanatory drawing showing an example of a storage state of a strength level managing table;

FIG. 7 is an explanatory drawing showing an example of a storage state of an ability managing table;

FIG. 8 is an explanatory drawing for explaining a variety of enemy characters generated from basic characters.

DETAILED DESCRIPTION OF THE INVENTION

Hereinafter, one embodiment of the present invention will be described with reference to the drawings.

Figure 1:
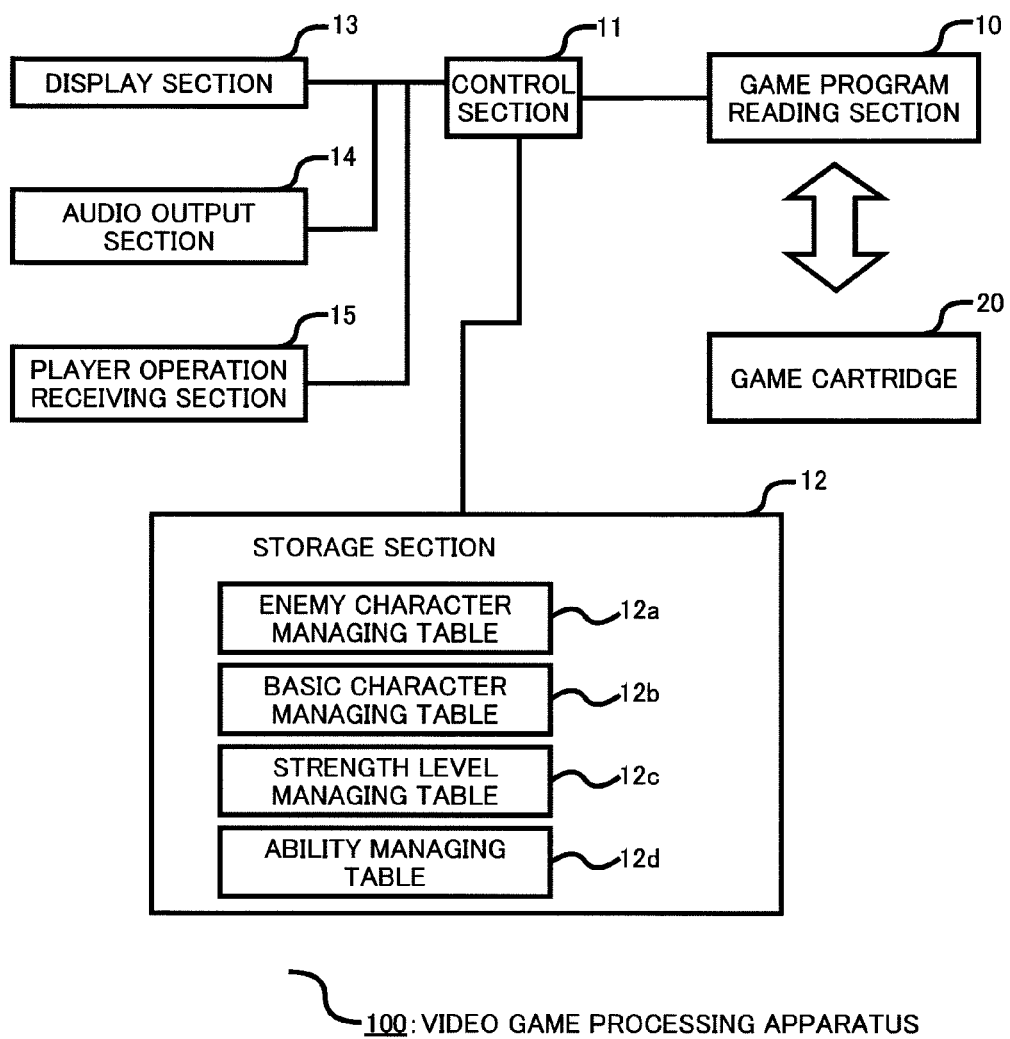
FIG. 1 is a block diagram showing a configuration example of a video game processing apparatus according to one embodiment of the present invention.

FIG. 1 is a block diagram showing a configuration example of a video game processing apparatus 100 according to one embodiment of the present invention. As shown in FIG. 1, the video game processing apparatus 100 includes a game program reading section 10, a control section 11, a storage section 12, a display section 13, an audio output section 14, and a player operation receiving section 15.

The game program reading section 10 detachably receives a game cartridge 20 in which a storage medium is to be embedded. A game program is stored in the storage medium. The game program reading section 10 reads out a necessary game program from the storage medium of the inserted game cartridge 20. In this regard, in this embodiment, a video game program that is classified into an action game or an RPG is stored in the storage medium embedded in the game cartridge 20. In this case, the video game may be any video game so long as it is one of the video games in which a player character fights against an enemy character in a battle scene.

The control section 11 has a function to execute the game program read out by the game program reading section 10 and to carry out various kinds of control for causing the video game to proceed in response to operations by a player.

The storage section 12 is a storage medium for storing a game program and various kinds of data required when to cause the video game to proceed. The storage section 12 is configured by a nonvolatile memory such as a RAM, for example. Various kinds of information to be registered and updated in accordance with progress of the video game and various kinds of information to be used in the video game read out from the storage medium embedded in the game cartridge 20 are stored in the storage section 12.

In the present embodiment, in the storage section 12, an enemy character managing table 12a, a basic character managing table 12b, a strength level managing table 12c and an ability managing table 12d are stored. The respective tables 12a to 12d will be described later in detail.

The display section 13 is a display device for displaying a game screen in response to progress of the video game and operations by the player in accordance with control of the control section 11. The display section 13 is configured by a liquid crystal display device, for example.

The audio output section 14 outputs audio in response to progress of the video game and operations by the player in accordance with control of the control section 11. The player operation receiving section 15 receives an operation signal according to operations by the player from a controller, and then informs the control section 11 of its result. The controller may be configured by a plurality of buttons, a mouse and the like.

Here, a summary of a method of managing enemy characters carried out by the video game processing apparatus 100 according to the present embodiment will be described. In the present embodiment, the video game is a video game having an object in which a player P operates a player character PC to make an attack on an enemy character NPC that is a battle opponent of the player character PC in the battle scene, whereby a life value (HP: hit point) of the enemy character NPC is led to a battle impossible value (for example, "0") to win the battle.

FIG. 2 is an explanatory drawing for explaining a summary of the method of managing enemy characters. In the present embodiment, for example, as shown in FIG. 2, basic character data containing basic data indicating basic characters BC-1 to BC-N ("N" is an arbitrary positive integer) and setup item data indicating items such as items allowed to set up to the selected basic character are provided for each of basic characters that becomes a basis for the enemy character NPC. These basic character data are stored in the basic character managing table 12b in advance. The "basic character data" will be described later in detail. Then, when a battle is to be started, the video game processing apparatus 100 generates an enemy character NPC, which is caused to appear on a battle, on the basis of the basic character data.

Next, an operation of the video game processing apparatus 100 according to the present embodiment will be described.

Figure 3:
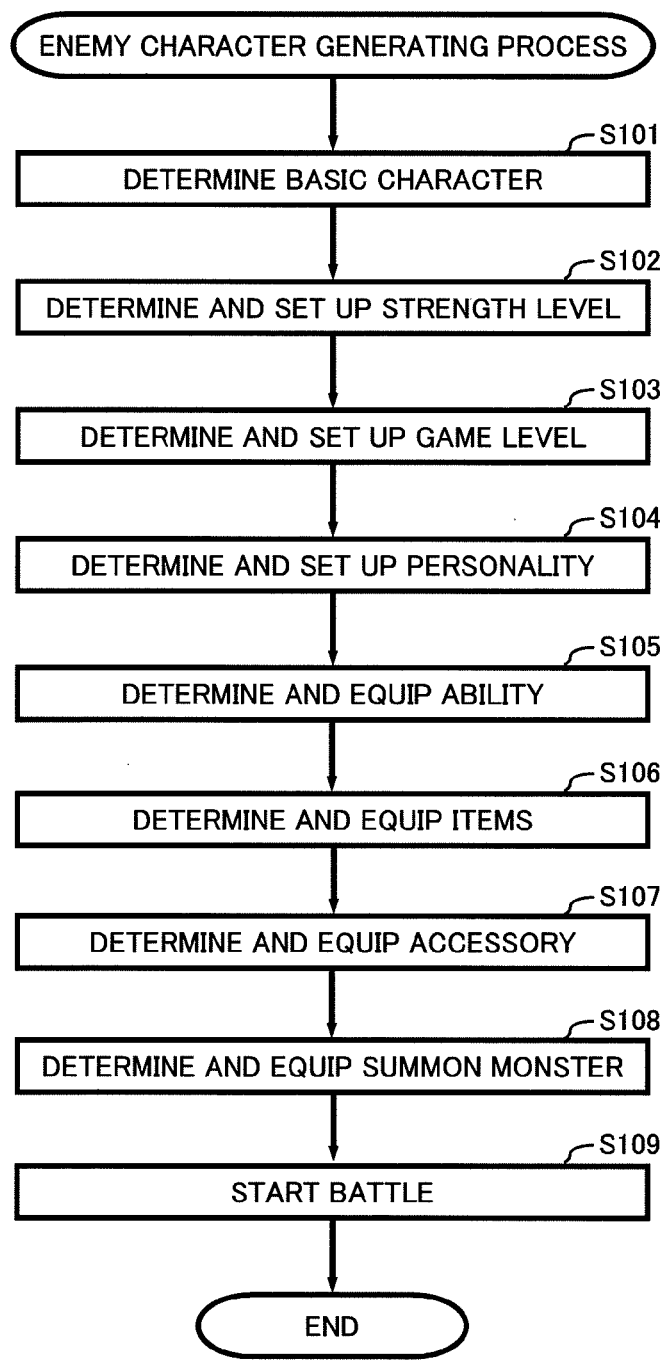
FIG. 3 is a flowchart showing an example of an enemy character generating process.

FIG. 3 is a flowchart showing an example of an enemy character generating process executed by the video game processing apparatus 100. In the enemy character generating process, a process to generate an enemy character NPC that becomes a fighting opponent of the player character PC is carried out. More specifically, the control section 11 in turn determines information configuring the enemy character, and stores the determined information in the enemy character managing table 12a, whereby the process to generate the enemy character data indicating the enemy character caused to appear on the battle is carried out.

FIG. 4 is an explanatory drawing showing an example of a storage state of the enemy character data in the enemy character managing table 12a at the time when the enemy character generating process is terminated. As shown in FIG. 4, the enemy character data contain: various kinds of information, by which enemy characters can be specified, such as IDs of basic characters each of which is to become a basis for an enemy character; strength levels of the enemy characters; levels on the video game (game levels) of the enemy character; abilities to equip; items to equip; accessories to equip; summon monster to equip; and HPs.

The enemy character generating process is started when a battle start operation is made in response to operations of the controller by the player P, for example. In this regard, in the case where the video game of the present embodiment is an RPG or the like, the enemy character generating process may be started when the control section 11 determines that the player character PC operated by the player P encounters an enemy character NPC on a movement field. In this case, for example, the control section 11 may be configured so as to monitor whether a distance between coordinates on the movement field at which the enemy character NPC is positioned and coordinates on the movement field at which the player character PC is positioned is within a predetermined distance or not.

In the enemy character generating process, the control section 11 first refers to the basic character managing table 12b, and determines a basic character, which becomes a basis for the enemy character NPC, of plural kinds of basic characters BC-1 to BC-N that can appear on the battle (Step S101). At Step S101, for example, the basic character may be determined randomly, or the basic character specified by the player may be determined as the basic character. In the case of an RPG, a basic character of the enemy character encountered by the player character PC may be determined as the basic character.

FIG. 5 is an explanatory drawing showing an example of a storage state of the basic character data in the basic character managing table 12b. As shown in FIG. 5, the basic character data contain: a basic character ID for uniquely specifying a basic character; a name of the corresponding basic character; basic parameter information such as the maximal HP every level on the video game (in addition to the maximal HP, the maximal MP (information indicating values of basic abilities such as a magic point, offensive power, defensive power, quickness and luck)); and setup item data (not shown in the drawings) indicating items such as items allowed to set up to the basic character.

Here, the control section 11 determines a basic character BC-1 of a basic character ID "0001" at Step S101, and generates the enemy character managing table 12a in which the basic character ID "0001" is set up.

Next, the control section 11 refers to the strength level managing table 12c; determines a "strength level" of the enemy character NPC; and sets up the corresponding items in the enemy character managing table 12a, which has been generated at Step S101 (Step S102). Here, the "strength level" in the present embodiment is used to determine RPG-like strength determined by a custom rank and battle action-like strength determined by an action rank. In this regard, the "RPG-like strength" means strength of an item or an accessory with which the corresponding character is to be equipped. The stronger the RPG-like strength is, the more effective item or accessory the corresponding character is equipped with. Further, the "battle action-like strength" means strength of a summon monster with which the corresponding character is to be equipped and strength of a command to be selected during a battle. The stronger the battle action-like strength is, the stronger summon monster the corresponding character is equipped with, and the more effective command (a command for carrying out an attack with bigger offensive power) is to be selected on the battle.

FIG. 6 is an explanatory drawing showing an example of a storage state of strength level information in the strength level managing table 12c. As shown in FIG. 6, the strength level information is information in which the strength level is associated with a custom rank, an action rank and an adjustment Lv (level). In the present embodiment, nine kinds of strength levels are prepared, and any of these strength levels is determined. The "custom ranks" are classified into five kinds including "weakest", "weak", "normal", "strong" and "the strongest". As the custom rank approaches "the strongest", the corresponding character becomes a stronger character about the RPG. The "action ranks" are classified into "A" to "H". As the action rank approaches "A", the corresponding character becomes a stronger character about the battle action. The "adjustment Lv" means a value for adjusting a level on the video game of the enemy character to be generated. In the present embodiment, a value obtained by adding the adjustment level to the level on the video game of the player character that becomes a fighting opponent of the enemy character becomes the level on the video game of the enemy character.

At Step S102, the control section 11 refers to the strength level managing table 12c, selects and determines one strength level for the enemy character NPC of the nine kinds of strength levels. At Step S102, the strength level may be determined randomly using random numbers, for example. Alternatively, a strength level specified by the player may be determined. Further, the video game may be configured so that the strength level is determined in accordance with identity of the player (information set up by the player in the video game, for example, information on strong and weak in an RPG, information indicating that the player is good or bad at an action game) or a level on the video game of the player character.

Next, the control section 11 determines a level on the video game of the enemy character NPC (game level), and sets up the corresponding item of the enemy character managing table 12a generated at Step S101 (Step S103). In the present embodiment, the control section 11 refers to the strength level managing table 12c to confirm an adjustment level associated with the strength level determined at Step S102; calculates a value by adding the adjustment level to the level on the video game of the player character PC that becomes a fighting opponent of the enemy character NPC; and determines that the calculated value is set to the level on the video game of the enemy character NPC. More specifically, in the case where a level of the player character PC is 40 and a strength level is "weakest", the level on the video game of the enemy character NPC becomes 35. In the present embodiment, it is determined that a level of the player character is one, its strength level is "normal" and a level on the video game of the enemy character NPC is one. In this regard, at Step S103, the level on the video game of the enemy character NPC may be determined randomly using random numbers, for example. Alternatively, the level may be determined as a level specified by the player.

Next, the control section 11 randomly determines a personality of the enemy character NPC using random numbers, for example (Step S104). In the present embodiment, a "strategic type", a "brave type" and the like are stored in the ability managing table 12d (will be described later) as personality of the enemy character NPC.

When the personality is determined, the control section 11 refers to the ability managing table 12d, and determines an ability in accordance with the determined personality and the level of the enemy character NPC. The determined ability is caused to be equipped with the enemy character NPC by setting up the corresponding item of the enemy character managing table 12a generated at Step S101 (Step S105).

FIG. 7 is an explanatory drawing showing an example of a storage state of ability managing information in the ability managing table 12d. As shown in FIG. 7, in the ability managing information, priority with which the enemy character NPC is to be equipped is set up on the basis of a kind of personality and a kind of ability. The priority is classified into any one of a double circle, a circle and a blank, and the priority has higher priority in this order. In the case where priority is the same, high or low of the priority is determined randomly. Moreover, in the present embodiment, an ability to be preferentially equipped and an ability not to be equipped are set up every kind of basic character. The control section 11 is configured, in accordance with these abilities, to store the number of abilities according to the levels on the video game of the enemy character in the enemy character managing table 12a.

Next, the control section 11 determines items with which the enemy character NPC is caused to be equipped, and causes the enemy character NPC to be equipped with the determined items by setting up the corresponding items of the enemy character managing table 12a generated at Step S101 (Step S106).

In the present embodiment, item levels from 1 to 15 are set up in the items. The control section 11 determines an equipped item level to be set up to the enemy character NPC in accordance with the "level" on the video game of the enemy character NPC and the "strength level" of the enemy character NPC. More specifically, the control section 11 calculates the equipped item level using the level of the enemy character NPC as a parameter on the basis of a mathematical formula "(equipped item level)={(level value of enemy character)−1)}/7+1". In this case, a decimal place of the term [{(level value of enemy character)−1)}/7)] is rounded down.

When the equipped item level is determined, the control section 11 refers to the enemy character managing table 12a. In the case where the custom rank corresponding to the "strength level" is "normal", the control section 11 selects items each having the same item level as the equipped item level for two of a weapon, a head and a body, and selects an item having an item level lower than the equipped item level by one level for the remaining one spot. The control section 11 then stores them in the enemy character managing table 12a.

In the case where the custom rank corresponding to the "strength level" is "weakest", the control section 11 selects items of the item level lower than the equipped item level by one level for all of the weapon, the head and the body. Further, in the case where the custom rank corresponding to the "strength level" is "weak", the control section 11 selects an item having the same item level as the equipped item level for one of the weapon, the head and the body, and selects items each having an item level lower than the equipped item level by one level for the remaining two spots. Further, in the case where the custom rank corresponding to the "strength level" is "strong", the control section 11 selects items each having the same item level as the equipped item level for all of the weapon, the head and the body. Further, in the case where the custom rank corresponding to the "strength level" is "the strongest", the control section 11 selects items each having an item level upper than the equipped item level by one level for all of the weapon, the head and the body. In this regard, the control section 11 may be configured so as to determine selection of the item level of the item to be equipped in accordance with the determined personality.

Next, the control section 11 determines accessories with which the enemy character NPC is to be equipped, and causes the enemy character NPC to be equipped with the accessories by setting up the corresponding item in the enemy character managing table 12a generated at Step S101 (Step S107).

In the present embodiment, the control section 11 first determines the number of accessories (the number of slots) to be equipped in accordance with the level on the video game of the enemy character NPC and the "strength level" of the enemy character NPC. It is determined so that the number of slots becomes larger as the level on the video game is higher and the custom rank corresponding to the "strength level" is stronger.

The control section 11 then selects accessories according to the equipped item level by the number of slots using the personality set up to the enemy character NPC as a parameter, and stores them in the enemy character managing table 12a. In this regard, the video game may be configured so that a set of plural accessories is stored in advance and this set is selected with a predetermined probability in the case where the number of slots, the equipped item level and the personality become a predetermined combination, for example.

Next, the control section 11 determines a summon monster with which the enemy character NPC is to be equipped, and causes the enemy character NPC to be equipped with the determined summon monster by setting up the corresponding item in the enemy character managing table 12a generated at Step S101 (Step S108). The summon monster means other NPC that can be caused to participate in a battle carried out in the video game according to the present embodiment by being summoned by means of the enemy character NPC.

In the present embodiment, in the summon monster, priority is set up in accordance with the personality of the enemy character NPC and the action rank corresponding to the "strength level". The control section 11 refers to the enemy character managing table 12a to confirm the personality of the enemy character NPC and the action rank corresponding to the "strength level". The control section 11 then selects a summon monster with which the enemy character NPC is to be equipped, and sets up the selected summon monster in the enemy character managing table 12a. In this regard, the summon monster is in turn acquired in accordance with progress of the video game. The control section 11 may be configured so as to select a summon monster with which the enemy character NPC is to be equipped from the summon monsters that the player character PC has already been acquired.

When setup of the enemy character managing table 12a is terminated by the processes at Step S101 to Step S108, the control section 11 causes the display section 13 to display the enemy character NPC indicated by the enemy character data set up in the enemy character managing table 12a on a battle screen, and starts a battle against the player character PC (Step S109).

Figure 9:
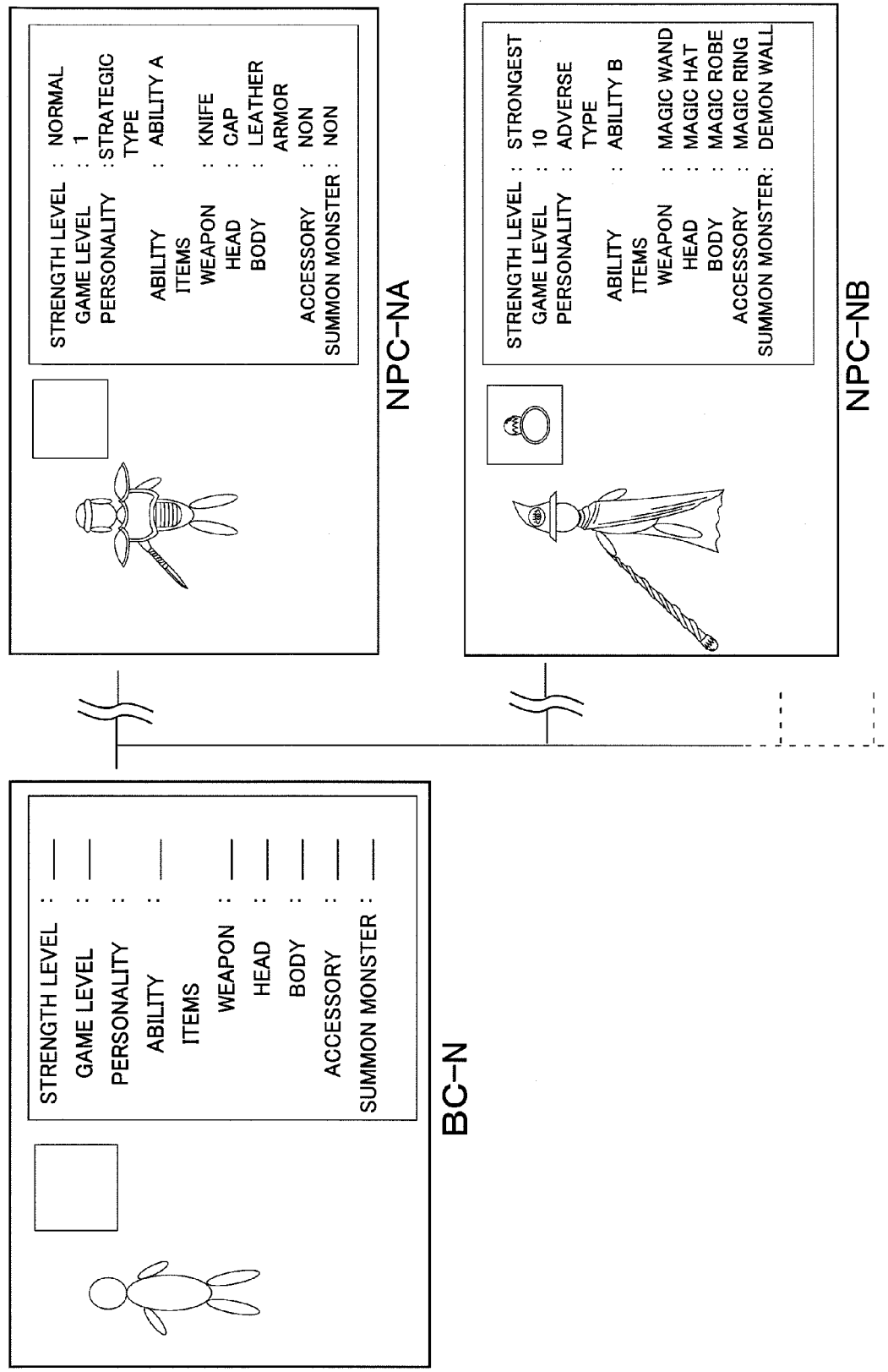
FIG. 9 is an explanatory drawing for explaining a variety of enemy characters generated from basic characters.

By the processes at Step S101 to Step S108 described above, for example, as shown in FIG. 8, a variety of enemy characters NPC, such as an enemy character NPC-1A and an enemy character NPC-1B, can be generated from a basic character BC-1. Further, for example, as shown in FIG. 9, a variety of enemy characters NPC, such as an enemy character NPC-NA and an enemy character NPC-NB can be generated from a basic character BC-N.

In this regard, although the ability, the equipped item, the equipped accessory and the equipped summon monster are determined on the basis of various standards in the embodiment described above, the ability, the equipped item, the equipped accessory and the equipped summon monster may be determined in accordance with only the strength level of the enemy character (or the corresponding custom rank or action rank).

Further, although the case where the enemy character data are automatically generated for the most part in the embodiment described above, the video game may be configured so that a screen for setting up an enemy character is presented to the player and a part or all of a strength level, a level on the video game, an ability, an equipped item, an equipped accessory and an equipped summon monster for the enemy character is determined in response to specification from the player. In this case, the control section 11 may refer to the basic character data stored in the basic character managing table 12b; present the player with an additional data specifying screen for specifying additional data on the items allowed to set up to the basic character determined at Step S101; and determine the additional data specified by the player using the additional data specifying screen as the additional data to be set up to the basic character. In this regard, the control section 11 may set up only a strength level of the enemy character in accordance with specification of the player, and automatically determine other items than the strength level.

As explained above, in the embodiment described above, the video game processing apparatus 100 is configured so that the player character operated by the player is displayed on the display screen, the video game processing apparatus 100 for controlling progress of the video game including a battle against an enemy character determines a basic character becoming a basis for the enemy character when a battle is started; determines additional data on items allowed to set up to the determined basic character (a strength level, a level on the video game, an ability, an equipped item, an equipped accessory, an equipped summon monster and the like of the enemy character); and generates the enemy character by setting up the determined additional data to the determined basic character. Therefore, it is possible to carry out battle control in which a fight (or battle) against a variety of enemy characters can be carried out in a battle scene without a need of management data containing a large amount of data.

Namely, the video game processing apparatus 100 is configured so as to determine the basic character becoming the basis for the enemy character and the additional data of the items allowed to set up to the basic character, and to generate the enemy character by setting up the additional data to the basic character. Therefore, it is possible to generate a variety of enemy characters rich in equipped states and setup content of parameters only by storing the data on the basic characters in advance without separately storing respective data on enemy characters caused to appear on a battle. Therefore, it is possible to carry out battle control in which a fight (or battle) against a variety of enemy characters can be carried out in a battle scene without a need of management data containing a large amount of data.

Further, in the embodiment described above, the items of the additional data allowed to set up to the basic character include at least one of the equipping ability, the equipped item and the equipped accessory in addition to the strength level on the battle and the level of the video game, and the video game processing apparatus 100 determines one strength level from plural steps of strength levels defined in advance; determines the level on the video game; of the enemy character on the basis of the level on the video game of the player character and the determined strength level; and determines the additional data on other items within a range defined by the determined strength level. In this case, it is possible to generate a variety of enemy characters corresponding to the strength level on the battle.

Further, in the embodiment described above, the video game processing apparatus 100 is configured so as to: include the basic character managing table 12b for storing the basic character data in which the basic character becoming the basis for the enemy character is associated with the items of the additional data allowed to set up to the basic character; refer to the basic character data to present the player with the additional data specifying screen for specifying the additional data on the items allowed to set up to the determined basic character; and determine the additional data specified using the additional data specifying screen as the additional data to be set up to the basic character. In this case, it is possible to generate a variety of enemy characters in accordance with desire of the player without a need of management data containing a large amount of data.

Further, in the embodiment described above, the video game processing apparatus 100 is configured so as to: include the basic character managing table 12b for storing the basic character data in which the basic character becoming the basis for the enemy character is associated with the items of the additional data allowed to set up to the basic character; and refer to the basic character data to automatically determine the additional data on the items allowed to set up to the basic character. In this case, it is possible to generate a variety of enemy characters automatically without a need of management data containing a large amount of data.

In this regard, in the embodiment described above, the video game processing apparatus 100 has been configured so as to carry out various processes such as the game process described above on the basis of the game program read out from the game cartridge 20. However, the game program may be acquired from a game server via a communication network such as the Internet. Further, the video game processing apparatus 100 may function as a game server to provide a game terminal with the game program via a communication network.

In this regard, in the embodiment described above, the video game processing apparatus 100 carries out the various processes described above in accordance with a control program (video game processing program) stored in a storage device (storage section 12) equipped by the video game processing apparatus 100.

According to the present invention, it is useful to carry out battle control in which a fight (or battle) against a variety of enemy characters can be carried out in a battle scene without a need of management data containing a large amount of data.

What is claimed is:

1. A video game processing apparatus for displaying a player character operated by a player on a display screen and controlling progress of a video game, the video game including a battle against an enemy character, the video game processing apparatus comprising:
   a display including the display screen;
   a memory that stores a plurality of equipped items and a plurality of basic characters, the memory being one of a nonvolatile memory and a random access memory;
   a basic character determiner that determines a basic character from among the plurality of basic characters stored in the memory when the battle is started, the basic character being a basis for the enemy character;
   an additional data determiner that determines a level on the video game of the enemy character, a strength level of the enemy character, additional data on the basic character, and an equipped item from among the plurality of equipped items stored in the memory; and an enemy character generator that generates the enemy character by configuring the basic character in accordance with the additional data determined by the additional data determiner and by equipping the basic character with the equipped item determined by the additional data determiner, wherein the additional data determiner determines the level on the video game of the enemy character and the strength level of the enemy character according to a level on the video game of the player character, the additional data determiner includes:

a basic level determiner that determines a basic equipped item level based on the level on the video game of the enemy character; and a custom level determiner that determines an adjusted level of the basic equipped item level based on a custom rank corresponding to the strength level of the enemy character, the additional data determiner determining the equipped item based on the adjusted level, the video game processing apparatus automatically determines, when the battle is started, the basic character, the level on the video game, the strength level, the additional data, and the equipped item, the enemy character generator generates the enemy character by the video game processing apparatus only storing data on the plurality of basic characters without separately storing data on the enemy character, and the display displays the enemy character generated by the enemy character generator on the display screen.

2. The video game processing apparatus according to claim 1, wherein the additional data on the basic character includes at least one of an equipped ability, an equipped summon monster, and an equipped accessory, and wherein the additional data determiner determines the strength level from plural steps of strength levels that are defined in advance, and determines the additional data as being within a range defined by the strength level.

3. The video game processing apparatus according to claim 1, further comprising:

a basic data memory that stores basic character data for configuring the basic character in accordance with the additional data; and an additional data specifying screen presenter that refers to the basic character data to present the player with an additional data specifying screen, the additional data specifying screen being used to specify the additional data for configuring the basic character determined by the basic character determiner, wherein the display displays the additional data specifying screen, and the additional data determiner determines the additional data using the additional data specifying screen.

4. The video game processing apparatus according to claim 1, further comprising:

a basic data memory for storing basic character data for configuring the basic character in accordance with the additional data, wherein the additional data determiner refers to the basic character data to automatically determine the additional data.

5. The video game processing apparatus according to claim 1, wherein the basic character determiner randomly determines the basic character.

6. The video game processing apparatus according to claim 1, wherein the additional data determiner determines the basic level of the equipped item based on a mathematical formula that includes the strength level of the enemy character as a variable.

7. The video game processing apparatus according to claim 1, wherein the additional data includes a personality of the basic character, and wherein the equipped item is determined from among the plurality of equipped items in accordance with a priority order set based on the personality of the basic character.

8. A method of processing a video game by displaying a player character operated by a player on a display screen and controlling progress of the video game, the video game including a battle against an enemy character, the method comprising:

storing a plurality of equipped items and a plurality of basic characters in a memory, the memory being one of a nonvolatile memory and a random access memory;

determining a basic character from among the plurality of basic characters stored in the memory when the battle is started, the basic character being a basis for the enemy character;

determining a level on the video game of the enemy character, a strength level of the enemy character, additional data on the basic character, and an equipped item from among the plurality of equipped items stored in the memory;

generating the enemy character by configuring the basic character in accordance with the additional data determined on the basic character and by equipping the basic character with the equipped item determined based on the level and the strength level; and displaying the enemy character generated in the generating on a display device, wherein the level on the video game of the enemy character and the strength level of the enemy character are determined according to a level on the video game of the player character, a basic equipped item level is determined based on the level on the video game of the enemy character, an adjusted level of the basic equipped item level is determined based on a custom rank corresponding to the strength level of the enemy character, the equipped item being determined based on the adjusted level, the basic character, the level on the video game, the strength level, the additional data, and the equipped item are automatically determined by the video game processing apparatus when the battle is started, and the enemy character is generated by the video game processing apparatus only by storing data on the plurality of basic characters without separately storing data on the enemy character.

9. The method according to claim 8, wherein the additional data on the basic character include at least one of an equipped ability, an equipped summon monster, and an equipped accessory, and wherein the strength level is determined from plural steps of strength levels that are defined in advance, and the additional data is determined as being within a range defined by the strength level.

10. The method according to claim 8, wherein the basic character is randomly determined.

11. method according to claim 8, wherein the basic level of the equipped item is determined based on a mathematical formula that includes the strength level of the enemy character as a variable.

12. The method according to claim 8, wherein the additional data includes a personality of the basic character, and
wherein the equipped item is determined from among the plurality of equipped items in accordance with a priority order set based on the personality of the basic character.

13. A non-transitory computer-readable medium including a computer program product for processing a video game by displaying a player character operated by a player on a display screen and controlling progress of the video game, the video game including a battle against an enemy character, the computer program product causing a computer to execute:
storing a plurality of equipped items and a plurality of basic characters in a memory;
determining a basic character from among the plurality of basic characters stored in the memory when the battle is started, the basic character being a basis for the enemy character;
determining a level on the video game of the enemy character, a strength level of the enemy character, additional data on the basic character, and an equipped item from among the plurality of equipped items stored in the memory; and
generating the enemy character by configuring the basic character in accordance with the additional data determined on the basic character and by equipping the basic character with the equipped item determined based on the level and the strength level,
wherein the level on the video game of the enemy character and the strength level of the enemy character are determined according to a level on the video game of the player character,
a basic equipped item level is determined based on the level on the video game of the enemy character,
an adjusted level of the basic equipped item level is determined based on a custom rank corresponding to the strength level of the enemy character, the equipped item being determined based on the adjusted level,
the basic character, the level on the video game, the strength level, the additional data, and the equipped item are automatically determined by the computer when the battle is started, and
the enemy character is generated by the computer only by storing data on the plurality of basic characters without separately storing data on the enemy character.

14. The non-transitory computer-readable medium according to claim 13, wherein the additional data on the basic character include at least one of an equipped ability, an equipped summon monster, and an equipped accessory, and
wherein the strength level is determined from plural steps of strength levels that are defined in advance, and the additional data is determined as being within a range defined by the strength level.

15. The non-transitory computer-readable medium according to claim 13, wherein the basic character is randomly determined.

16. The non-transitory computer-readable medium according to claim 13, wherein the basic level of the equipped item is determined based on a mathematical formula that includes the strength level of the enemy character as a variable.

17. non-transitory computer-readable medium according to claim 13, wherein the additional data includes a personality of the basic character, and
wherein the equipped item is determined from among the plurality of equipped items in accordance with a priority order set based on the personality of the basic character.

* * * * *